US012471190B2

(12) United States Patent
Taurino

(10) Patent No.: US 12,471,190 B2
(45) Date of Patent: Nov. 11, 2025

(54) VARIABLE PITCH AND VARIABLE RADIUS INDUCTOR COIL DESIGNS WITHIN AN AEROSOL-GENERATING DEVICE

(71) Applicant: Philip Morris Products S.A., Neuchatel (CH)

(72) Inventor: Irene Taurino, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 812 days.

(21) Appl. No.: 17/055,745

(22) PCT Filed: May 16, 2019

(86) PCT No.: PCT/EP2019/062720
§ 371 (c)(1),
(2) Date: Nov. 16, 2020

(87) PCT Pub. No.: WO2019/219867
PCT Pub. Date: Nov. 21, 2019

(65) Prior Publication Data
US 2021/0204603 A1 Jul. 8, 2021

(30) Foreign Application Priority Data
May 17, 2018 (EP) .................................... 18173058

(51) Int. Cl.
*A24F 40/30* (2020.01)
*A24F 40/42* (2020.01)
(Continued)

(52) U.S. Cl.
CPC ............. *H05B 6/108* (2013.01); *A24F 40/30* (2020.01); *A24F 40/42* (2020.01); *A24F 40/465* (2020.01); *A24F 40/10* (2020.01); *A24F 40/20* (2020.01)

(58) Field of Classification Search
CPC ......... A24F 40/42; A24F 40/465; A24F 40/30
See application file for complete search history.

(56) References Cited

U.S. PATENT DOCUMENTS 6,336,027 B1 1/2002 Sakai et al.
10,791,760 B2 * 10/2020 Zuber ............... A61M 15/0028
(Continued)

FOREIGN PATENT DOCUMENTS

CN 203748673 U 8/2014
CN 203762288 U 8/2014
(Continued)

OTHER PUBLICATIONS

Kangjie Song et al., Experimental and numerical study of the effect of coil structure on induction nitriding temperature field, Jul. 1, 2014 (Year: 2014).*
(Continued)

*Primary Examiner* — Vanessa Girardi
(74) *Attorney, Agent, or Firm* — Oblon, McClelland, Maier & Neustadt, L.L.P.

(57) ABSTRACT

An aerosol-generating device is provided, including: a housing defining a chamber configured to receive at least one susceptor and at least one aerosol-forming substrate, the chamber having a length along a longitudinal axis thereof extending from a first end of the chamber to a second end of the chamber; and an inductor coil provided within the housing, disposed around the chamber, and extending along at least a portion of the length of the chamber, the inductor coil including a first portion disposed closest to the first end of the chamber, a second portion disposed closest to the second end of the chamber, and a third portion disposed between the first and the second portions, and a number of
(Continued)

turns per unit length in the third portion is less than a number of turns per unit length in one or both of the first and the second portions.

7 Claims, 3 Drawing Sheets

(51) Int. Cl.

| | |
|---|---|
| ***A24F 40/465*** | (2020.01) |
| ***H05B 6/10*** | (2006.01) |
| *A24F 40/10* | (2020.01) |
| *A24F 40/20* | (2020.01) |

(56) References Cited

U.S. PATENT DOCUMENTS

| | | | |
|---|---|---|---|
| 2015/0168894 | A1 | 6/2015 | Isono et al. |
| 2016/0234886 | A1 | 8/2016 | Laghi et al. |
| 2017/0055580 | A1 | 3/2017 | Blandino et al. |
| 2018/0007972 | A1 | 1/2018 | Thorens |
| 2018/0014573 | A1 | 1/2018 | Silvestrini et al. |
| 2018/0027883 | A1 | 2/2018 | Zuber et al. |
| 2018/0184712 | A1 | 7/2018 | Fraser et al. |
| 2019/0191767 | A1 | 6/2019 | Wu et al. |
| 2019/0230988 | A1 | 8/2019 | Aoun |
| 2019/0364973 | A1 | 12/2019 | Kaufman et al. |
| 2022/0183368 | A1 | 6/2022 | Abi Aoun et al. |
| 2022/0408825 | A1 | 12/2022 | Abi Aoun et al. |

FOREIGN PATENT DOCUMENTS

| | | | |
|---|---|---|---|
| CN | 203952405 | U | 11/2014 |
| CN | 204519364 | U | 8/2015 |
| CN | ON 206808677 | U | 12/2017 |
| CN | 107801375 | A | 3/2018 |
| CN | 207250275 | U | 4/2018 |
| EA | 012481 | B1 | 10/2009 |
| EP | 2 625 975 | A1 | 8/2013 |
| EP | 3 183 980 | A1 | 6/2017 |
| EP | 3 208 068 | A1 | 8/2017 |
| EP | 3 506 721 | A1 | 7/2019 |
| EP | 4 140 335 | A1 | 3/2023 |
| GB | 365/873 | | 1/1932 |
| JP | 11-26148 | A | 1/1999 |
| JP | 2000-30850 | A | 1/2000 |
| JP | 2015-56224 | A | 3/2015 |
| JP | 2015-118256 | A | 6/2015 |
| JP | 2019-129620 | A | 8/2019 |
| JP | 6766128 | B2 | 10/2020 |
| RU | 2 606 866 | C1 | 1/2017 |
| RU | 2 643 422 | C2 | 2/2018 |
| TW | 201811205 | A | 4/2018 |
| WO | WO 2015/165813 | A1 | 11/2015 |
| WO | WO 2015/177253 | A1 | 11/2015 |
| WO | WO 2015/177294 | A1 | 11/2015 |
| WO | WO 2016/207357 | A1 | 12/2016 |
| WO | WO 2017/001818 | A1 | 1/2017 |
| WO | WO 2017/036950 | A2 | 3/2017 |
| WO | WO 2017/036955 | A2 | 3/2017 |
| WO | WO 2017/108992 | A1 | 6/2017 |
| WO | WO 2018/002086 | A1 | 1/2018 |
| WO | WO 2018/019578 | A1 | 2/2018 |
| WO | WO 2018/019738 | A1 | 2/2018 |
| WO | WO 2018/033477 | A1 | 2/2018 |
| WO | WO 2018/041450 | A1 | 3/2018 |
| WO | WO 2018/050735 | A1 | 3/2018 |
| WO | WO 2018/138072 | A1 | 8/2018 |
| WO | WO 2019/030170 | A1 | 2/2019 |
| WO | WO 2019/234245 | A1 | 12/2019 |

OTHER PUBLICATIONS

Extended European Search Report issued May 9, 2023 in European Patent Application No. 22213999.0, 11 pages.

German Nullity Action issued Oct. 6, 2022 in German Patent Application No. 20 2019 005 781 U1, 36 pages.

Baake, "Technisches Gutachten", Gebrauchsmusterinhaber: Phillip Morris Products S.A., retrieved Oct. 7, 2022, pp. 1-20.

Rudnev et al., "Handbook of Induction Heating", Marcel Dekker, Inc., 2003, Total pp. 17.

White et al., "FDTD Simulation of Induction Heating of Conducting Ceramic Ware", Materials Research Society, vol. 430, 1996, pp. 377-382.

Song et al., "Experimental and numerical study of the effect of coil structure on induction nitriding temperature field", Advances in Mechanical Engineering, Jul. 1, 2014, pp. 1-23.

Combined Russian Office Action and Search Report issued in corresponding Russian Patent Application No. (with English Translation), 19 pages.

Roman Szewczyk , "Assessment of Uncertainty of Determination of Parameters of Jiles-Atherton Model of Hysteresis Loops of Isotropic Materials"—Warsaw University of Technology, Institute of Metrology and Biomedical Engineering, 2016, pp. 162-165, doi:10.15199/48.2016.11.40.

Office Action issued on Apr. 20, 2023 in the corresponding Japanese Patent Application No. 2020-564421 (with English Translation), 12 Pages.

International Search Report and Written Opinion issued on Aug. 30, 2019 in PCT/EP2019/062720 filed on May 16, 2019.

Japanese Notification of Reason(s) for Refusal issued Apr. 11, 2022 in Japanese Patent Application No. 2020-564421, 11 pages (with English Machine Translation).

Japanese Office Action issued Jul. 27, 2023 in Japanese Patent Application No. 2022-18706 (with English Translation), 22 pages.

Combined Chinese Office Action and Search Report issued Aug. 1, 2023 in Chinese Patent Application No. 201980027749.6 (with English Translation), 18 pages.

Japanese Office Action mailed on Nov. 30, 2023 issued in Japanese Patent Application No. 2022-185809 filed on Nov. 21, 2022, with English Translation, total 13 pages.

Korean Office Action mailed on Feb. 1, 2024 issued in Korean Patent Application No. 10-2020-7031944 filed Nov. 5, 2020, with English Translation, total 12 pages.

Kuchling, Horst: Physik. 18. Auflage, Leipzig, 1987, S. 377, 392, 393—ISBN 3-343-00209-7.

* cited by examiner

VARIABLE PITCH AND VARIABLE RADIUS INDUCTOR COIL DESIGNS WITHIN AN AEROSOL-GENERATING DEVICE

The present invention relates to aerosol-generating devices. In particular, the invention relates to aerosol-generating devices having an inductive heater for heating an aerosol-generating article using a susceptor. The present invention also relates to an aerosol-generating systems including such aerosol-generating devices in combination with an aerosol-generating article or cartridge for use with the aerosol-generating device.

A number of electrically-operated aerosol-generating systems in which an aerosol-generating device having an electric heater is used to heat an aerosol-forming substrate, such as a tobacco plug, have been proposed in the art. Typically, the aerosol-generating substrate is provided as part of an aerosol-generating article which is inserted into a chamber or cavity in the aerosol-generating device. In some known systems, to heat the aerosol-forming substrate to a temperature at which it is capable of releasing volatile components that can form an aerosol, a resistive heating element such as a heating blade is inserted into or around the aerosol-forming substrate when the aerosol-generating article is received in the aerosol-generating device. In other aerosol-generating systems, an inductive heater is used rather than a resistive heating element. The inductive heater typically comprises an inductor forming part of the aerosol-generating device and a conductive susceptor element arranged such that it is in thermal proximity to the aerosol-forming substrate. During use, the inductor generates an alternating magnetic field to generate eddy currents and hysteresis losses in the susceptor element, causing the susceptor element to heat up, thereby heating the aerosol-forming substrate.

In some known systems having an inductor and a conductive susceptor element, the susceptor element is typically fixed within the chamber of the aerosol-generating device and configured such that it extends at least partially into an aerosol-generating article received in the cavity. The susceptor element heats the aerosol-forming substrate of the aerosol-generating article from within when energised by the inductor coil. For example, the susceptor element may be arranged to penetrate the aerosol-forming substrate of the aerosol-generating article when the aerosol-generating article is received in the chamber.

In some other known systems having an inductor and a conductive susceptor element, the susceptor can be included in a cartridge, which is received within a chamber of an aerosol-generating device having the inductor. The cartridge contains a first compartment containing a nicotine source, and a second compartment containing an acid source. The nicotine source and the acid source are heated and reacted with one another in the gas phase to form an aerosol that is inhaled by the user.

The inductor is typically provided in the form of a wire forming an inductor coil having a plurality of turns, or windings, extending along its length. However, such conventional coils may not always allow for precise control over the temperature produced by the susceptor when the susceptor is inductively heated. In particular, it may be difficult to obtain a uniform temperature from the susceptor, when using such conventional coils.

It would therefore be desirable to provide an aerosol-generating device having an improved inductor coil, which can help to overcome such drawbacks.

According to a first aspect of the present invention there is provided an aerosol-generating device comprising: a housing defining a chamber for receiving at least one susceptor and at least one aerosol-forming substrate, the chamber having a length along its longitudinal axis extending from a first end of the chamber to a second end of the chamber; and an inductor coil provided within the housing, disposed around the chamber, and extending along at least a portion of the length of the chamber. The inductor coil comprises a first portion disposed closest to the first end of the chamber, a second portion disposed closest to the second end of the chamber, and a third portion disposed between the first and second portions. The number of turns per unit length in the third portion of the coil is less than the number of turns per unit length in one or both of the first and second portions of the coil.

The present inventors have appreciated that when a conventional coil with a constant density of turns is used in an aerosol-generating device, there is a higher magnetic flux density in the region surrounded by the central (third) portion of the coil, compared to the magnetic flux density which occurs in the regions respectively surrounded by the first and second end portions of the coil. The region surrounded by the central portion of the coil can therefore be heated to a greater extent than the regions respectively surrounded by the first and second end portions of the coil, when a susceptor is placed within said regions. This can lead to a non-uniform temperature profile within the chamber of the device, which may be undesirable. Such non-uniform temperature profiles can be particularly undesirable when the inductor coil is being used to heat a susceptor located within a cartridge containing a nicotine source and an acid source. This is because a temperature gradient in such an arrangement can undesirably lead to condensation and re-evaporation of different parts of the sensorial mediums, and thus negatively impact the performance of the system. Furthermore, such cartridges may require precise calibration in order for a specific amount of nicotine to mix with a specific amount of acid. Non-uniform temperature gradients may lead to incorrect amounts of the nicotine or acid being delivered to the mixing chamber and thus negatively impact the performance of the system.

In order to obtain a more uniform temperature profile from a susceptor within the chamber, the present inventors have appreciated that the inductor coil can be advantageously configured such that the number of turns per unit length in the third portion of the coil is less than the number of turns per unit length in one or both of the first and second portions of the coil. This can advantageously result in an increased magnetic flux density being present at one or both ends of a susceptor placed within the chamber. In particular, the coil can be configured such that the magnetic flux density is more uniformly distributed along the entire length of the region surrounded by the coil, and in particular the entire length of a region within the chamber that is occupied or will be occupied by a susceptor. With such an arrangement the ends of a susceptor placed in said region can be heated to temperatures more closely matching the temperature of the central portion of the susceptor.

The present inventors have also appreciated that an alternative, yet also advantageous solution is to configure the inductor coil such that the cross sectional area of the coil in the third portion of the coil is greater than the cross sectional area of the coil in one or both of the first and second portions of the coil. With this arrangement, a reduction can be made to the magnetic flux density in the region surrounded by the third portion of the coil such that the magnetic flux density in this region is more closely matched to the magnetic flux density occurring in the regions respectively surrounded by the first and second portions of the coil. This can therefore help for a more uniform temperature to be produced along the length of the susceptor.

Therefore, according to a second aspect of the present invention, there is provided an aerosol-generating device comprising: a housing defining a chamber for receiving at least one susceptor and at least one aerosol-forming substrate, the chamber having a length along its longitudinal axis extending from a first end of the chamber to a second end of the chamber; and an inductor coil provided within the housing, disposed around the chamber, and extending along at least a portion of the length of the chamber. The inductor coil comprises a first portion disposed closest to the first end of the chamber, a second portion disposed closest to the second end of the chamber, and a third portion disposed between the first and second portions. The cross sectional area of the coil in the third portion of the coil is greater than the cross sectional area of the coil in one or both of the first and second portions of the coil.

The cross sectional area of the coil is taken in a plane perpendicular to the longitudinal axis of the coil. Where the inductor coil's cross section varies along the length of the coil in the third section of the coil, the above reference to cross sectional area of the coil in the third portion, should be taken to mean average cross sectional area of the coil in the third portion. An equivalent consideration applies in respect of each of the first and second portions of the coil.

Preferably, the inductor coil has a circular cross-sectional shape. The inductor coil may have a non-circular cross-sectional shape. For example, the inductor coil may have an elliptical, triangular, square, rectangular, trapezoidal, rhomboidal, diamond, kite, pentagonal, hexagonal, heptagonal, octagonal, nonagonal, decagonal, or any other polygonal cross-sectional shape. The inductor coil may have a regular polygonal cross-sectional shape. For example, an equilateral triangular, square, regular pentagonal, regular hexagonal, regular heptagonal, regular octagonal, regular nonagonal, or regular decagonal cross-sectional shape.

Where the inductor coil has a circular cross-sectional shape the diameter of the coil in the third portion of the coil is greater than the diameter of the coil in one or both of the first and second portions of the coil.

The inductor coil may be formed from a wire having a plurality of turns, or windings, extending along its length. The wire may have any suitable cross-sectional shape, such as square, oval, or triangular. In some embodiments, the wire has a circular cross-section. In other embodiments, the wire may have a flat cross-sectional shape. For example, the inductor coil may be formed from a wire having a rectangular cross-sectional shape and wound such that the maximum width of the cross-section of the wire extends parallel to the magnetic axis of the inductor coil. Such flat inductor coils may allow the outer diameter of the inductor, and therefore the outer diameter of the aerosol-generating device, to be minimized.

Preferably, the number of turns per unit length in the third portion of the coil is less than the number of turns per unit length in one or both of the first and second portions of the coil and the cross sectional area of the coil in the third portion of the coil is greater than the cross sectional area of the coil in one or both of the first and second portions of the coil.

Preferred features of one or both of the first and second aspects are described below.

In some preferred embodiments, the number of turns per unit length remains substantially constant within the first portion of the coil.

In some preferred embodiments, the number of turns per unit length in the inductor coil progressively decreases from the first portion of the coil to the third portion of the coil. This may help to ensure that the field produced in the region surrounded by the first portion of the coil is more closely matched to the field produced in the region surrounded by the third portion of the coil.

In some preferred embodiments, the number of turns per unit length remains substantially constant within the second portion of the coil.

In some preferred embodiments, the number of turns per unit length in the inductor coil progressively decreases from the second portion of the coil to the third portion of the coil. This may help to ensure that the field produced in the region surrounded by the second portion of the coil is more closely matched to the field produced in the region surrounded by the third portion of the coil.

The decrease in the number of turns may be linear. The decrease in the number of turns may be non-linear. For example, the decrease in the number of turns may be exponential.

In some preferred embodiments, the number of turns per unit length in the first portion of the coil is substantially equal to the number of turns per unit length in the second portion of the coil. This may advantageously help to ensure that the field produced in the region surrounded by the first portion of the coil is more closely matched to the field produced in the region surrounded by the second portion of the coil.

Where the number of turns per unit length remains substantially constant within the third portion of the coil, and the number of turns per unit length remains substantially constant within one or both of the first and second portions of the coil, the number of turns per unit length may transition in a step from one or both of the first and second portions of the coil to the third portion of the coil. Alternatively or additionally, the coil may include a fourth portion disposed between the first portion of the coil and the third portion of the coil. The number of turns per unit length may progressively decrease through the fourth portion of the coil from the first portion of the coil to the third portion of the coil.

As a further alternative or addition, the coil may include a fifth portion disposed between the second portion of the coil and the third portion of the coil. The number of turns per unit length may progressively decrease through the fifth portion of the coil from the second portion of the coil to the third portion of the coil.

Preferably, the length of the first portion of the coil as measured along the longitudinal axis of the coil is substantially equal to the length of the second portion of the coil as measured along the longitudinal axis of the coil.

Preferably, the length of the first portion of the coil as measured along the longitudinal axis of the coil is substantially equal to the length of the third portion of the coil as measured along the longitudinal axis of the coil.

Preferably, the length of the second portion of the coil as measured along the longitudinal axis of the coil is substantially equal to the length of the third portion of the coil as measured along the longitudinal axis of the coil.

In some preferred embodiments, the number of turns per unit length in the third portion of the coil is at least about 2 times smaller than the number of turns per unit length in one or both of the first and second portions of the coil, more preferably at least about 3 times smaller than the number of turns per unit length in one or both of the first and second portions of the coil, even more preferably at least about 4 times smaller than the number of turns per unit length in one or both of the first and second portions of the coil.

The number of turns per millimetre length in the first portion of the coil may be between about 1 and about 2, more preferably between about 1 and about 1.5. The number of turns per unit millimetre in the second portion of the coil may be between about 1 and about 2, more preferably between about 1 and about 1.5. The number of turns per millimetre length in the third portion of the coil may be between about 0.25 and about 0.5.

In some preferred embodiments, the cross sectional area of the coil remains substantially constant within the first portion of the coil.

In some preferred embodiments, the cross sectional area of the inductor coil progressively increases from the first portion of the coil to the third portion of the coil. This may help to ensure that the field produced in the region surrounded by the first portion of the coil is more closely matched to the field produced in the region surrounded by the third portion of the coil.

In some preferred embodiments, the cross sectional area of the coil remains substantially constant within the second portion of the coil.

In some preferred embodiments, the cross sectional area of the inductor coil progressively increases from the second portion of the coil to the third portion of the coil. This may help to ensure that the field produced in the region surrounded by the second portion of the coil is more closely matched to the field produced in the region surrounded by the third portion of the coil.

In some preferred embodiments, the cross sectional area of the inductor coil in the first portion of the coil substantially corresponds to the cross sectional area of the inductor coil in the second portion of the coil. This may advantageously help to ensure that the field produced in the region surrounded by the first portion of the coil is more closely matched to the field produced in the region surrounded by the second portion of the coil.

In some preferred embodiments, the cross sectional area of the coil in the third portion of the coil is at least 1.3 times bigger than the cross sectional area of the coil in one or both of the first and second portions of the coil, more preferably at least about 1.5 times bigger than the cross sectional area of the coil in one or both of the first and second portions of the coil.

In some preferred embodiments, the cross sectional area of the coil remains substantially constant within the third portion of the coil.

Where the cross sectional area coil remains substantially constant within the third portion of the coil, and the cross sectional area of the coil remains substantially constant within one or both of the first and second portions of the coil, the cross sectional area of the coil may transition in a step from one or both of the first and second portions of the coil to the third portion of the coil. Alternatively or additionally, the coil may include a fourth portion disposed between the first portion of the coil and the third portion of the coil. The cross sectional area of the coil may progressively increase through the fourth portion of the coil from the cross sectional area of the first portion of the coil to the cross sectional area of the third portion of the coil.

As a further alternative or addition, the coil may include a fifth portion disposed between the second portion of the coil and the third portion of the coil. The cross sectional area of the coil may progressively increase through the fifth portion of the coil from the cross sectional area of the second portion of the coil to the cross sectional area of the third portion of the coil.

In some preferred embodiments, the first portion of the coil is positioned directly adjacent to one side of the third portion of the coil and the second portion of the coil is positioned directly adjacent to the other side of the third portion of the coil. In such embodiments, the coil may consists solely of the first, second and third portions.

The aerosol-generating device may comprise a power supply electrically connectable to the inductor coil. The power supply is preferably configured to provide an alternating electric current to the inductor coil. The power supply may be disposed within the housing of the device. The power supply may be a DC power supply. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for one or more user experiences; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of the atomising assembly.

The aerosol-generating device may comprise control circuitry configured to control a supply of power from the power supply to the inductor coil. The control circuitry may comprise a microcontroller. The microcontroller is preferably a programmable microcontroller. The control circuitry may comprise further electronic components. The control circuitry may be configured to regulate a supply of power to the inductor coil. Power may be supplied to the inductor coil continuously following activation of the system or may be supplied intermittently, such as on a puff-by-puff basis.

The aerosol-generating system may comprise a first power supply arranged to supply power to the control circuitry and a second power supply configured to supply power to the inductor coil.

In some preferred embodiments, the aerosol-generating device comprises a susceptor disposed within the chamber. Preferably, the susceptor is elongate. Preferably, the susceptor has a first end which is secured to a wall of the chamber and a second end, which extends into the chamber. Preferably, the susceptor is centrally located within the chamber. Preferably, the susceptor is surrounded by the inductor coil. Preferably, the susceptor is longitudinally aligned with the inductor coil. Preferably, the second end of the susceptor is pointed.

In preferred embodiments, the magnetic axis of the inductor coil is substantially parallel with the longitudinal axis of the chamber. The magnetic axis of the inductor coil may be the same as the longitudinal axis of the coil. This may help to facilitate a more compact arrangement. Preferably, at least a portion of the susceptor is substantially parallel with the magnetic axis of the inductor coil. This may help to further facilitate even heating of the susceptor by the inductor coil. In particularly preferred embodiments, the susceptor is substantially parallel with the magnetic axis of the inductor coil, and with the longitudinal axis of the chamber.

As used herein, a "susceptor" means an element, such as a conductive element, which heats up when subjected to a changing magnetic field. This may be the result of eddy currents induced in the susceptor element and/or hysteresis losses.

The material and the geometry for the susceptor element can be chosen to provide a desired electrical resistance and heat generation.

Possible materials for the susceptor elements include graphite, molybdenum, silicon carbide, stainless steels, niobium, aluminium and virtually any other conductive elements. The susceptor element may be a ferrous element. The susceptor element may be a ferrite element. The susceptor element may be a stainless steel element. The susceptor element may be a ferritic stainless steel element. Suitable susceptor materials include 410, 420 and 430 stainless steel. Advantageously, it has been found that arranging a susceptor element comprising ferritic stainless steel within either of the chambers, in contact with the carrier material of the nicotine source or the acid source, does not result in the transfer of the susceptor material from the susceptor element into the aerosol generated by the system.

The susceptor element may comprise an outer surface which is chemically inert. Chemically inert is understood herein to mean with respect to at least one of the nicotine of the nicotine source and the acid of the acid source when heated to the temperature by the susceptor element. The susceptor element may comprise an outer surface which is chemically inert to the nicotine of the nicotine source. The susceptor element may comprise an outer surface which is chemically inert to the acid of the acid source.

The susceptor element may comprise an electrically conductive susceptor material that is chemically inert. In other words, the chemically inert surface may be a chemically inert outer surface of the susceptor material itself.

The chemically inert outer surface may be a protective external layer. In embodiments where the electrically conductive susceptor material is not chemically inert, the susceptor element may have a protective external layer, for example a protective ceramic layer or protective glass layer covering or enclosing the susceptor element. The susceptor element may comprise a protective coating formed by a glass, a ceramic, or an inert metal, formed over a core of susceptor material. Advantageously, providing the susceptor element with a chemically inert outer surface may inhibit or prevent unwanted chemical reactions from occurring between the susceptor element and the nicotine of the nicotine source and the acid of the acid source. A protective external layer or coating material may withstand temperatures as high as the susceptor material is heated.

The material of the susceptor element may be chosen because of its Curie temperature. Above its Curie temperature a material is no longer ferromagnetic and so heating due to hysteresis losses no longer occurs. In the case the susceptor element is made from one single material, the Curie temperature may correspond to a maximum temperature the susceptor element should have (that is to say the Curie temperature is identical with the maximum temperature to which the susceptor element should be heated or deviates from this maximum temperature by about 1-3%). This reduces the possibility of rapid overheating.

If the susceptor element is made from more than one material, the materials of the susceptor element can be optimized with respect to further aspects. For example, the materials can be selected such that a first material of the susceptor element may have a Curie temperature which is above the maximum temperature to which the susceptor element should be heated. This first material of the susceptor element may then be optimized, for example, with respect to maximum heat generation and transfer to the aerosol-forming substrate to provide for an efficient heating of the susceptor on one hand. However, the susceptor element may then additionally comprise a second material having a Curie temperature which corresponds to the maximum temperature to which the susceptor should be heated, and once the susceptor element reaches this Curie temperature the magnetic properties of the susceptor element as a whole change. This change can be detected and communicated to a microcontroller which then interrupts the generation of AC power until the temperature has cooled down below the Curie temperature again, whereupon AC power generation can be resumed.

At least a portion of the susceptor element may be fluid permeable. As used herein a "fluid permeable" element means an element that allowing liquid or gas to permeate through it. The susceptor element may have a plurality of openings formed in it to allow fluid to permeate through it. In particular, the susceptor element allows the source material, in either gaseous phase or both gaseous and liquid phase, to permeate through it.

As an alternative or in addition to providing a susceptor as part of the aerosol-generating device, the device may be configured to receive an article, such as a cartridge which contain a susceptor. Therefore according to a third aspect of the present invention there is provided an aerosol-generating device according to the first or second aspect of the invention, and a cartridge configured to be received within the chamber of the aerosol-generating device, the cartridge comprising at least one susceptor and a at least one aerosol-forming substrate.

In some preferred embodiments the cartridge comprises: a first compartment containing a nicotine source; a second compartment containing an acid source; a mixing chamber for mixing nicotine from the nicotine source and acid from the acid source with an air flow to form an aerosol. Preferably, the at least one susceptor is configured to heat the mixing chamber. Preferably, the at least one susceptor is configured to heat the first compartment and the second compartment.

In some preferred embodiments, when the cartridge is disposed within the chamber, the at least one susceptor extends along the longitudinal axis of the chamber and comprises a first portion surrounded by the first portion of the inductor coil, a second portion surrounded by the second portion of the inductor coil, and third portion surrounded by the third portion of the inductor coil.

In some preferred embodiments, each susceptor within the cartridge has a length substantially equal to the length of the inductor coil.

As used herein with reference to the invention, the term "air inlet" is used to describe one or more apertures through which air may be drawn into a component or portion of a component of the cartridge or aerosol-generating device.

As used herein with reference to the invention, the term "air outlet" is used to describe one or more apertures through which air may be drawn out of a component or portion of a component of the cartridge or aerosol-generating device.

As used herein with reference to the invention, the terms "proximal", "distal", "upstream" and "downstream" are used to describe the relative positions of components, or portions of components, of the cartridge and aerosol-generating system.

As used herein with reference to the invention, the term "longitudinal" is used to describe the direction between the proximal end and the opposed distal end of the cartridge or aerosol-generating system and the term "transverse" is used to describe the direction perpendicular to the longitudinal direction.

As used herein with reference to the invention, the term "length" is used to describe the maximum longitudinal dimension of components, or portions of components, of the cartridge or aerosol-generating system parallel to the longitudinal axis between the proximal end and the opposed distal end of the cartridge or aerosol-generating system.

As used herein with reference to the invention, the terms "height" and "width" are used to describe the maximum transverse dimensions of components, or portions of components, of the cartridge or aerosol-generating system or aerosol-generating device perpendicular to the longitudinal axis of the cartridge or aerosol-generating system. Where the height and width of components, or portions of components, of the cartridge or aerosol-generating s system are not the same, the term "width" is used to refer to the larger of the two transverse dimensions perpendicular to the longitudinal axis of the cartridge or aerosol-generating system.

As used herein with reference to the invention, the term "elongate" is used to describe a component or portion of a component having a length greater than the width and height thereof.

As used herein with reference to the invention, the term "nicotine", is used to describe nicotine, nicotine base or a nicotine salt. In embodiments in which the first carrier material is impregnated with nicotine base or a nicotine salt, the amounts of nicotine recited herein are the amount of nicotine base or amount of ionised nicotine, respectively.

As used herein, the term 'aerosol former' is used to describe any suitable known compound or mixture of compounds that, in use, facilitates formation of an aerosol.

As used herein, the terms 'upstream' and 'downstream' are used to describe the relative positions of elements, or portions of elements, of the heater assembly, cartridge, or aerosol-generating system in relation to the direction in which air is drawn through the system during use thereof.

As used herein, the term 'longitudinal' is used to describe the direction between the upstream end and the downstream end of the heater assembly, cartridge, or aerosol-generating system and the term 'transverse' is used to describe the direction perpendicular to the longitudinal direction. With reference to the heater assembly, the term 'transverse' refers to the direction parallel to the plane of the porous sheet or sheets, while the term 'perpendicular' refers to the direction perpendicular to the plane of the porous sheet or sheets.

The aerosol-generating system may be a handheld aerosol-generating system configured to allow a user to suck on a mouthpiece to draw an aerosol through the mouth end opening. The aerosol-generating system may have a size comparable to a conventional cigar or cigarette. The aerosol-generating system may have a total length between about 30 mm and about 150 mm. The aerosol-generating system may have an external diameter between about 5 mm and about 30 mm.

Features of one aspect of the invention may be applied to the other aspects of the invention.

Embodiments of the invention will now be described in detail, by way of example only, with reference to the accompanying drawings, in which.

Figure 1:
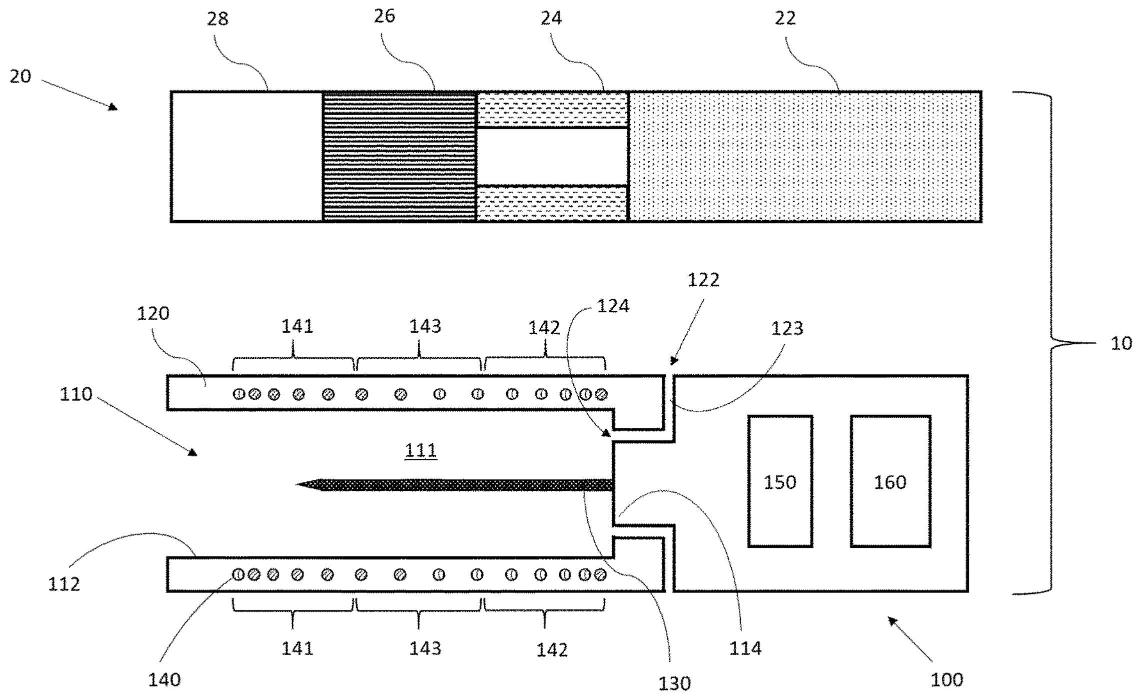
FIG. 1 shows a schematic view of an aerosol-generating system according to a first embodiment of the present invention, the system being in an unassembled condition.

FIG. 1 is shows a schematic view of an aerosol-generating system 10 according to a first embodiment of the present invention, the system 10 being in an unassembled condition. The system comprises an aerosol-generating article 20 and an aerosol-generating device 100. The aerosol-generating article 20 comprises four elements. The elements are: an aerosol generating substrate 22, a hollow tubular support element 24, an aerosol-cooling element 26 and a filter segment 28. The four elements are arranged sequentially and in coaxial alignment and are assembled by a cigarette paper (not shown) to form a rod. The rod has a mouth-end defined by the filter segment 28, which a user inserts into his or her mouth during use, and a distal end defined by the an aerosol generating substrate 22, located at the opposite end of the rod to the mouth end. Elements located between the mouth-end and the distal end can be described as being upstream of the mouth-end or, alternatively, downstream of the distal end 8.

The aerosol-generating device comprises a housing 120. A cavity 110 extends from an opening at one end of the housing 120 to a cavity base 114. The cavity defines a chamber 111 for receiving at least a portion of the aerosol-generating article 20. A first end of the chamber 111 is located at the opening in the housing 120, and a second end of the chamber 111 is located at the base 114 of the cavity. The cavity is defined by an inner surface 112 of the housing 120 of the device 100.

Within the cavity is a susceptor 130. The susceptor is secured to the base 114 of the cavity and extends from the base 114 of the cavity towards the opening of the cavity 110. The cavity has a longitudinal axis which extends from the base 114 of the cavity 110 to the opening in the housing 120.

The housing includes at least one device air inlet 122 which is formed by an opening in the outer surface of the housing 120. At least one device airflow channel 123 extends within the housing 120 from the at least one device air inlet 122 to at least one device air outlet 124 located in the base 114 of the cavity 110.

An inductor coil 140 is provided within the housing 120. The coil 140 is disposed around the chamber 111 and extends along at least a portion of the length of the chamber 111. The coil consists of a first portion 142 disposed closest to the first end of the chamber 111, a second portion 142 disposed closest to the second end of the chamber 111, and a third portion 143 disposed between the first and second portions of the coil 140.

As illustrated by FIG. 1, the number of turns per unit length in the third portion 143 of the coil is less than the number of turns per unit length in each of the first and second portions of the coil 141, 142. In particular, the number of turns per unit length in the inductor coil 140 progressively decreases from a first end of the coil 140 defined by the first portion 141 of the coil to the central point of the coil 140 defined by the third portion 143 of the coil. Furthermore, the number of turns per unit length in the inductor coil 140 progressively decreases from a second end of the coil 140 defined by the second portion 142 of the coil to the central point of the coil 140 defined by the third portion 143 of the coil. As also shown in FIG. 1, the number of turns per unit length in the first portion 141 of the coil is substantially equal to the number of turns per unit length in the second portion 142 of the coil.

The device 100 further includes control circuitry 150 coupled to the coil 140. The control circuitry 140 is configured to provide an alternating electric current from a power supply 160 within the device 100 to the inductor coil 140 such that, in use, the inductor coil 140 generates an alternating magnetic field to heat the susceptor 130.

Figure 2:
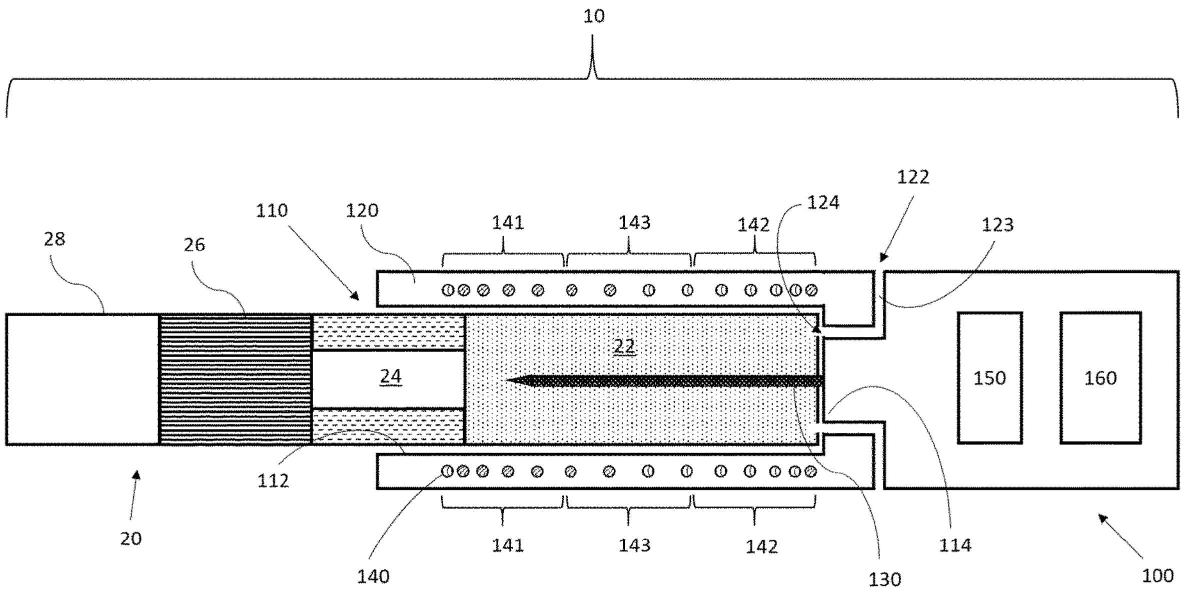
FIG. 2 shows schematic view of the system of FIG. 1 in an assembled condition.

FIG. 2 shows the system 10 of FIG. 1 in an assembled condition. In this condition, the article 20 has been inserted through the opening in the housing such that at least the aerosol-forming substrate 22 is located within the chamber 111. The filter segment 28 is disposed outside of the housing 120 so that it is accessible for a user. The susceptor 130 has pierced the substrate 22 and is surrounded by the substrate 22. Therefore, when an alternating electric current is provided to the inductor coil 140, the susceptor becomes inductively heated and causes the substrate 22 to be heated. A user can then draw on the mouth-end of the article 20 causing air to flow into the device through the device air inlet 122 and subsequently through the heated substrate 22. Aerosol released by the heated substrate 22 can then be carried towards the mouth-end of the article 20.

Figure 3:
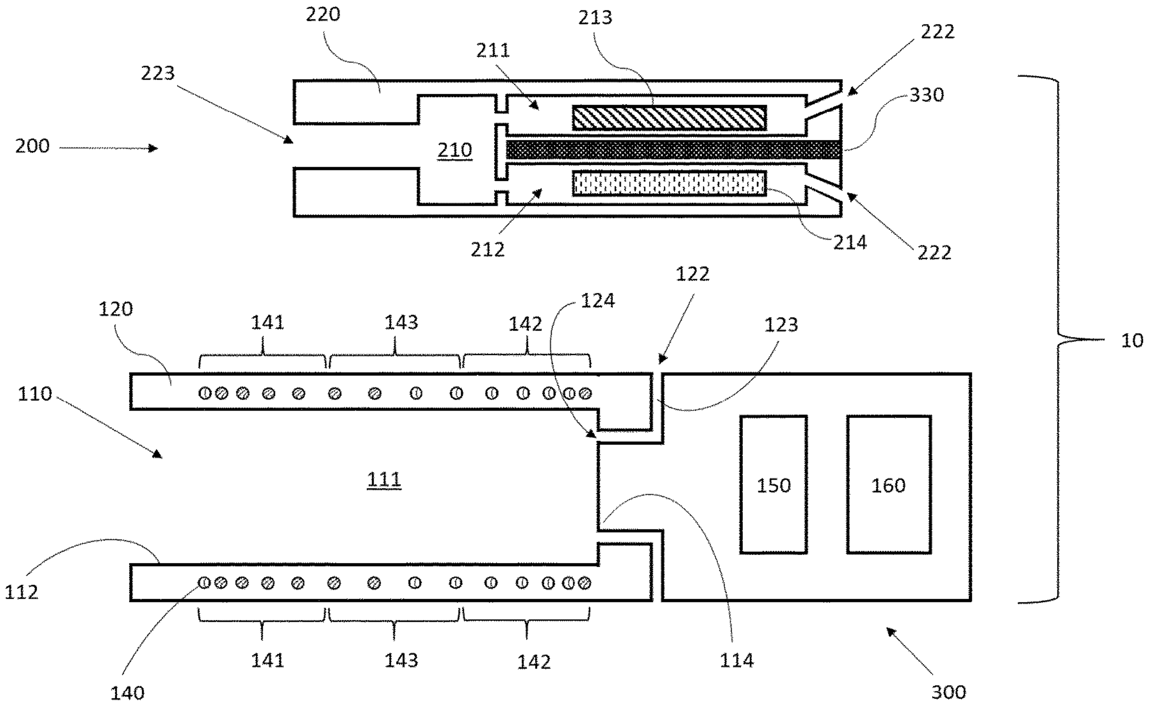
FIG. 3 shows a schematic view of an aerosol-generating system according to a second embodiment of the present invention, the system being in an unassembled condition.

FIG. 3 shows a schematic view of an aerosol-generating system 310 according to a second embodiment of the present invention, the system 310 being in an unassembled condition. The system 310 comprises an aerosol-generating device 300 and a cartridge 200 for use with the aerosol-generating device 300.

The device 300 of the second embodiment is similar to the device 100 of the first embodiment, and where applicable, like reference numerals are used to indicate like items. However, in the embodiment of FIG. 3, the susceptor is no longer provided as part of the device 300. Instead, the susceptor 330 is provided as part of the cartridge 200. In particular, the cartridge 200 comprises a housing 220 and the susceptor is provided within the cartridge housing 220. The housing 200 has a plurality of openings forming a plurality of air inlets 222 at its upstream end and another opening 223 at its downstream end, with a cartridge airflow path extending therebetween.

The cartridge 200 comprises a first compartment 211 containing a nicotine source 213 and a second compartment 212 containing an acid source 214, each of which is located downstream of a respective air inlet 222. A mixing chamber 210 is also included downstream of the first and second compartments 211, 212.

Figure 4:
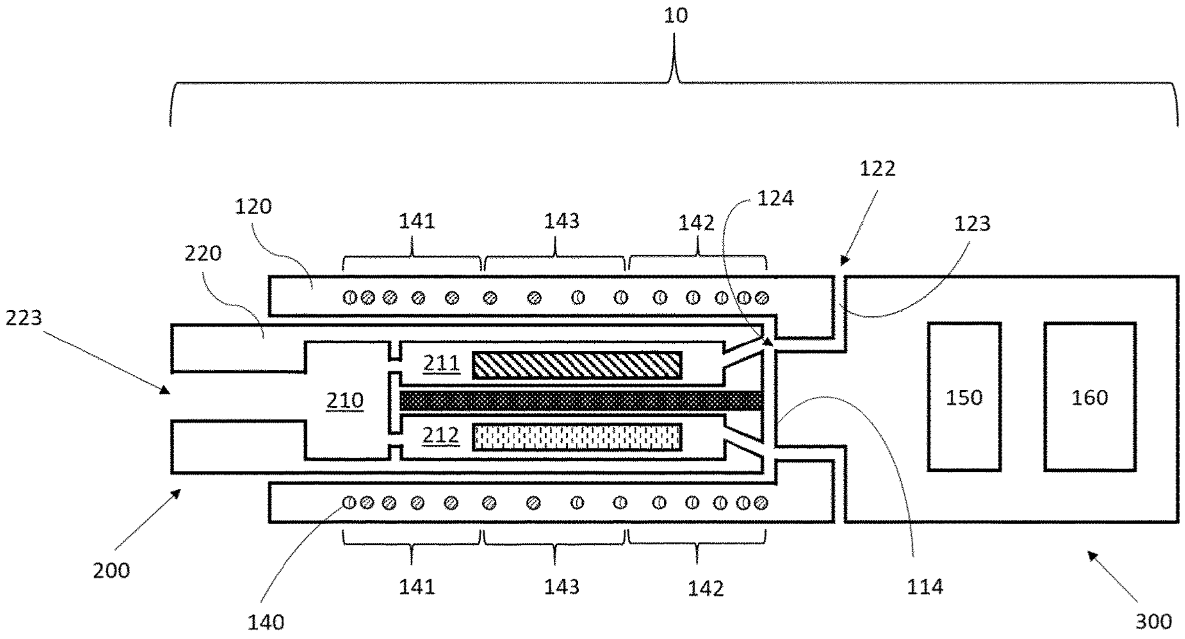
FIG. 4 shows schematic view of the system of FIG. 3 in an assembled condition.

As best appreciated from the assembled condition of the second embodiment shown in FIG. 4, when the cartridge is inserted into the chamber 111 of the device 300, the susceptor 330 is located within the region surrounded by the inductor coil 140. In particular, a central portion of the susceptor 330 is located within the region surrounded by the third portion 143 of the inductor coil 140, whereas the first and second ends of the susceptor are located within regions respectively surrounded by the first and second portions 141, 142 of the inductor coil 140.

In use, an alternating electric current is provided to the coil 140 from power supply 160 such that the inductor coil 140 generates an alternating magnetic field to heat the susceptor 130. The heated susceptor 130 causes vapour to be released from the nicotine source 213 and aerosol to be released from the acid source 214. As a user draws on the mouth end of the cartridge these aerosols are drawn downstream and into the mixing chamber 210 where they mix and react to form a nicotine containing aerosol, which then passes downstream to the user.

Figure 5:
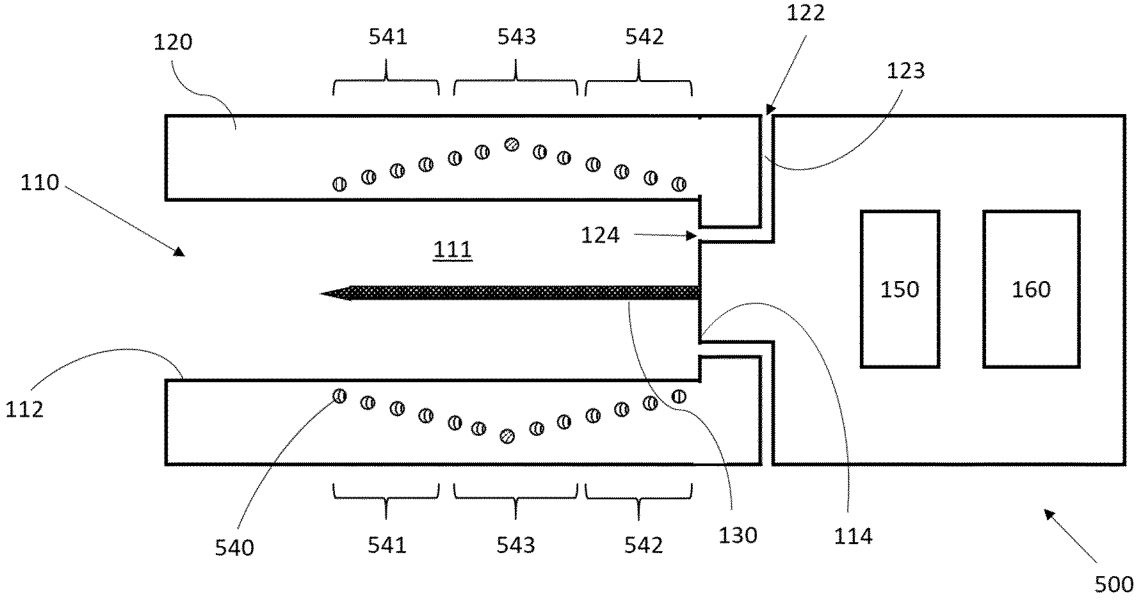
FIG. 5 shows a schematic view of an aerosol-generating device in accordance with a third embodiment of the present invention.

FIG. 5 shows a schematic view of an aerosol-generating device 500 in accordance with a third embodiment of the present invention. The device 500 of FIG. 5 is similar to the devices 100, 300 of the first and second embodiments, and where applicable, like reference numerals are used to indicate like items. However, in the embodiment of FIG. 5, the inductor coil 540 now has a different configuration. In particular, the coil 540 is now configured such that cross sectional area of the coil in the third portion 543 of the coil is greater than the cross sectional area of the coil in each of the first and second portions of the coil 541, 542. In particular, the cross sectional area of the coil progressively increases from a first end of the coil 540 defined by the first portion 541 of the coil to the central point of the coil 540 defined by the third portion 543 of the coil. Furthermore, the cross sectional area of the coil 540 progressively increases from a second end of the coil 540 defined by the second portion 542 of the coil to the central point of the coil 540 defined by the third portion 543 of the coil. As also shown in FIG. 5, the cross sectional area of the coil in the first portion 541 of the coil substantially corresponds to the cross sectional area of the coil in the second portion 542 of the coil.

The invention claimed is:

1. An aerosol-generating device, comprising:

a housing defining a chamber configured to receive at least one susceptor and at least one aerosol-forming substrate, the chamber having a length along a longitudinal axis thereof extending from a first end of the chamber to a second end of the chamber; and an inductor coil provided within the housing, disposed around the chamber, and extending along at least a portion of the length of the chamber, wherein the inductor coil comprises a first portion disposed closest to the first end of the chamber, a second portion disposed closest to the second end of the chamber, and a third portion disposed between the first and the second portions, wherein a number of turns per unit length in the third portion of the inductor coil is at least 2 times smaller than a number of turns per unit length in one or both of the first and the second portions of the inductor coil, wherein a length of the first portion of the inductor coil as measured along a longitudinal axis of the inductor coil is substantially equal to a length of the second portion of the inductor coil as measured along the longitudinal axis of the inductor coil, and wherein the number of turns per millimeter length in the third portion of the coil is between about 0.25 and about 0.5.

2. The aerosol-generating device according to claim 1, wherein a number of turns per unit length in the inductor coil progressively decreases from the first portion of the inductor coil to the third portion of the inductor coil, and/or wherein a number of turns per unit length in the inductor coil progressively decreases from the second portion of the inductor coil to the third portion of the inductor coil.

3. The aerosol-generating device according to claim 1, wherein a number of turns per unit length in the first portion of the inductor coil is substantially equal to a number of turns per unit length in the second portion of the inductor coil.

4. An aerosol-generating system, comprising:

an aerosol-generating device according to claim 1, and a cartridge configured to be received within the chamber of the aerosol-generating device, the cartridge comprising the at least one susceptor and the at least one aerosol-forming substrate.

5. The aerosol-generating system according to claim 4, wherein the cartridge further comprises:

a first compartment containing a nicotine source;

a second compartment containing an acid source; and a mixing chamber configured for mixing of nicotine from the nicotine source and acid from the acid source with an air flow to form an aerosol, wherein the at least one susceptor is configured to heat one or both of the first compartment and the second compartment.

6. The aerosol-generating system according to claim 4, wherein when the cartridge is disposed within the chamber, the at least one susceptor extends along the longitudinal axis of the chamber and comprises a first portion surrounded by the first portion of the inductor coil, a second portion surrounded by the second portion of the inductor coil, and third portion surrounded by the third portion of the inductor coil.

7. The aerosol-generating system according to claim 4, wherein each susceptor within the cartridge has a length substantially equal to a length of the inductor coil.

* * * * *